March 15, 1966 N. HUGHES 3,240,253
SONIC PRESSURE WAVE ATOMIZING APPARATUS AND METHODS
Filed Feb. 25, 1963 4 Sheets-Sheet 1

INVENTOR.
NATHANIEL HUGHES
BY
Curtis, Morris & Safford
ATTORNEYS

March 15, 1966 N. HUGHES 3,240,253
SONIC PRESSURE WAVE ATOMIZING APPARATUS AND METHODS
Filed Feb. 25, 1963 4 Sheets-Sheet 3

INVENTOR.
NATHANIEL HUGHES.
BY
Curtis, Morris & Safford
ATTORNEYS

United States Patent Office 3,240,253
Patented Mar. 15, 1966

3,240,253
SONIC PRESSURE WAVE ATOMIZING
APPARATUS AND METHODS
Nathaniel Hughes, Bronx, N.Y., assignor to Sonic Development Corporation of America, Yonkers, N.Y.
Filed Feb. 25, 1963, Ser. No. 260,738
23 Claims. (Cl. 158—4)

This invention relates to apparatus and methods utilizing sonic pressure waves in the atomizing of fluent materials and in the burning of combustible fluids.

Atomizers and atomizing methods presently known suffer from many practical disadvantages. It is an object of this invention to provide novel and superior apparatus and methods for atomizing liquids, gases and other fluent materials without these disadvantages.

Previously known liquid atomizers produce sprays of particles whose size varies not only over a wide range, but also from one region of the spray to another. This non-uniformity of particle size is undesirable because it causes unpredictable results and reduces the efficiency of the equipment in which the atomizers are used. In addition, the mean size of the drops produced by prior atomizers usually varies substantially with changes in the viscosity of the liquid being atomized, and with pressure and flow rate fluctuations ordinarily experienced in commercially available pressurized liquid supplies. Hence, when any of these parameters changes, corresponding undesirable changes often occur in the operation and output of the equipment in which the atomizers are used.

Accordingly, one object of this invention is to provide atomizing devices which atomize liquids into droplets which are relatively uniform in size and whose size is relatively independent of the viscosity of the liquid being atomized and ordinary variations of the pressures and flow rates of the liquid.

Previous liquid atomizing devices have commonly used relatively high liquid and air pressures and have used such methods as forcing the liquids to be atomized through small orifices under high pressure, or breaking up liquid streams into particles by directing them against solid barriers. Some of the disadvantages of such arrangements are that they are not efficient, that they require heavy and expensive equipment to pressurize and feed the liquids through such orifices at such high pressures, and that they limit the quantity of fluid that can be handled. Furthermore, such orifices often become clogged when solid particles get into the liquid or when fluids solidify in the orifices.

Accordingly, another object of this invention is to provide efficient atomizing devices to which the liquids to be atomized can be supplied at relatively low pressures and which are relatively free from malfunctions due to clogging of the atomizer's liquid flow passages.

A further object of this invention is to provide such atomizers which produce spray clouds of atomized droplets which move away from the atomizer with a relatively low velocity so as to remain in the most effective operating area for a relatively long period of time.

Still further, it is an object of this invention to provide such atomizers which have means for controlling the speed and shape of the cloud of atomized particles as they move away from the atomizer.

In the past, atomizers using gas-operated sonic pressure wave generators to atomize fluids have been proposed. However, they have not achieved notable success for several reasons. They do not produce uniformly atomized fluids in quantities sufficient for industrial purposes. Also, these prior atomizers require a relatively high input gas supply pressure, and they are not efficient. Further, some of these prior atomizers require complex mechanisms for introducing the fluid into the sonic pressure wave field, and some require special chambers in which to subject the fluid to the agitating action of this field.

It is, therefore, still another object of this invention to provide sonic pressure wave-operated atomizing devices which produce relatively uniform atomization of fluent materials in commercially usable quantities, require relatively low input gas pressures, are of simple construction, inexpensive to manufacture, efficient to use, and easy to maintain.

Atomizers of the present invention are especially advantageously used in equipment for burning fluent materials. A major deficiency of most fuel burners previously available is that they produce incomplete combustion of the fuel and thus are relatively inefficient. This incomplete combustion produces substantial deposits of unburned carbon on the furnace walls, boiler tubes and other related surfaces in the furnace, flues and stacks, and therefore greatly increases the cost of maintaining the equipment.

Accordingly, a further object of this invention is to provide fuel burning equipment which burns fluent fuel materials relatively completely and efficiently, even at very high and very low flow rates, while being of relatively simple and economical construction.

Another problem with many prior fuel burning devices is that they lack flame stability. For example, they are subject to "flame drift" and "rumbling" due to the pulsation and non-uniformity of the flame, and they experience "flameouts," that is, unexpected extinguishment of the flame due to sudden drafts or other causes. This instability permits unwanted escape of fuel into the furnace, thus wasting fuel and causing additional expense in cleaning and maintaining the burning equipment and furnace surfaces.

Therefore, another object of this invention is to produce such burning apparatus which provides high flame stability and which is relatively free from flame-out and other such malfunctions.

Another inefficient feature of prior burners is that they often produce a "hard" flame; that is, a flame that is projected from the burner at a high velocity. When such a flame is applied to boiler tubes or other such objects to be heated, the flames rush past the tubes so fast that there is relatively little time for the flame to transfer its heat to them, and consequently the heating operation is not efficient because much heat is wasted.

Hence, it is yet another object of this invention to provide fuel burners which produce "soft," relatively low-velocity flames and therefore provide a relatively high rate of heat transfer between the flame and the objects to be heated.

The drawings and description that follow describe the invention and indicate some of its uses and advantages.

Each embodiment of the present invention disclosed herein uses, as a source of sonic pressure wave energy, a generator constructed in accordance with the inventions disclosed in my co-pending applications for United States Patent Serial No. 239,236, filed on November 21, 1962, Serial No. 247,221, filed on December 26, 1962, Serial No. 260,736, filed on February 25, 1963, which applications are hereby incorporated in and made an integral part of this description. Broadly, sonic generators in accordance with the above-mentioned co-pending applications utilize a pressurized-gas-supplied nozzle having a diverging exit region to create a high-speed, low-pressure, gas jet which is directed into a cavity pulsator to create a sonic pressure wave output. In accordance with the present invention, such a generator is combined with a structure for introducing the fluent material to be atomized into the sonic pressure wave field in a novel manner to form an atomizer unit in which the material is effectively atomized and projected outwardly in the highly advantageous form of a cloud of microscopic droplets.

Figure 1:
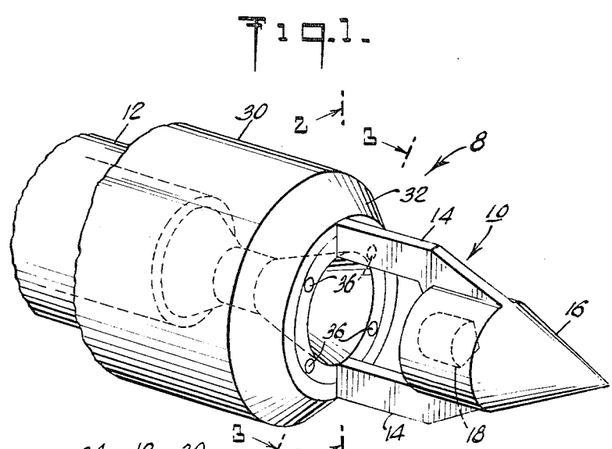
FIGURE 1 is a perspective view of a sonic pressure wave-operated atomizing unit embodying the present invention.
Figure 2:
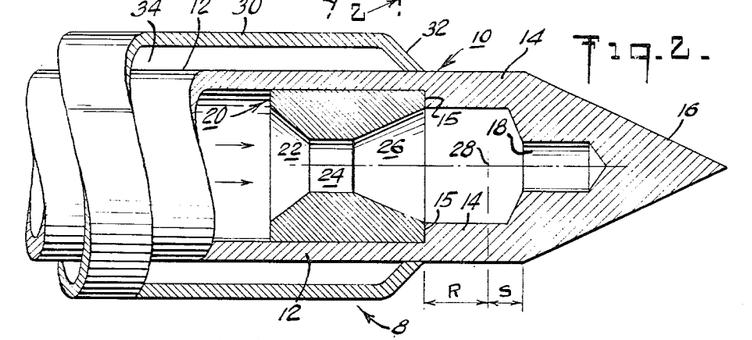
FIGURE 2 is a vertical sectional view of this unit taken along line 2—2 of FIGURE 1 in the direction of the arrows.
Figure 3:
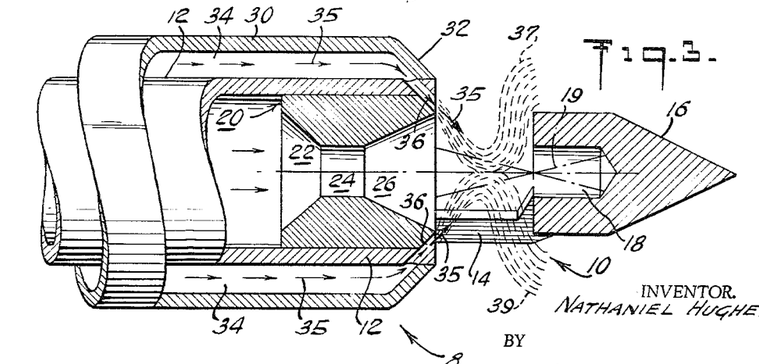
FIGURE 3 is another sectional view of this unit taken in the plane of the fuel supply orifices along line 3—3 of FIGURE 1 in the direction of the arrows.

Referring specifically to FIGURES 1 through 3 of the drawings, the atomizing unit shown, generally indicated at 8, includes a nozzle housing member, generally indicated at 10, which comprises a tubular-shaped section 12 connected to a pair of leg-like members 14 terminating in a pointed, conically shaped end portion 16 containing a pulsator cavity 18 with its open end facing toward tubular member 12.

A cylindrical nozzle member, generally indicated at 20, is brazed or force-fit into nozzle housing member 10 with its forward end abutting undercut portions 15 of the rear ends of legs 14. Nozzle member 20 has a converging inlet section 22, a cylindical middle or "stabilizing" section 24, and a diverging outlet section 26. A source of pressurized gas (not shown) is connected to tubular portion 12 of nozzle housing 10. Pressurized gas flows from the supply through nozzle 20 and emerges in the form of a gas jet which is intercepted by pulsator cavity 18. When thus energized the unit generates powerful sonic pressure waves in the manner described in my above-mentioned co-pending patent applications.

When constructed and operated in accordance with the above-mentioned patent applications, the nozzle 20 produces a gas jet having a Mach number greater than 1.0 and preferably greater than 1.6. The nozzle also produces at its exit a pressure less than the pressure of the gas surrounding the nozzle and preferably less than one or two pounds per square inch absolute (p.s.i.a.). As is described in greater detail in my above-identified co-pending patent applications, it is believed that a train of oblique shock waves is set up in the jet in the process of deceleration of the jet gas and its return to a state of equilibrium with the ambient gas. The probable outline of such waves is indicated at 19 in FIGURE 3. Since the pressure in the jet at the nozzle exit is sub-ambient, the first wave downstream from the nozzle exit is a compressional shock wave which tends to compress the jet gas and return it to ambient pressure. The entrance to cavity 18 is located approximately at the first intersection point of the shock wave outline, and the reflecting rear wall of the cavity is located in the last half of the first shock wave. That is, the reflecting rear wall is located between $\lambda$ and $3/2\lambda$ downstream from the plane of location of the diameter $D_A$, the diameter of the nozzle's gas passageway at the position where the pressure of the gas in the passageway equals ambient pressure, where $\lambda$ is given approximately by the following equation:

(1) $$\lambda = 1.307 \, D_A \sqrt{M_E^2 - 1}$$

In which:

$D_A$ is in inches, and $M_E$ is the Mach number of the gas flowing at the nozzle exit opening.

As is well-known in the art of compressible fluid dynamics (see, for example, A. H. Shapiro, "The Dynamics and Thermodynamics of Compressible Fluid Flow," volume 1, Chapter 4, Ronald Press, New York, 1953) the jet speed and pressure desired can be obtained from a converging-diverging nozzle having dimensions determined from the following equations (assuming isentropic flow in the nozzle):

$$\frac{A}{A^*} = \frac{1}{M}\left[\left(\frac{1}{k+1}\right)\left(1+\frac{k-1}{2}M^2\right)\right]^{\frac{k+1}{2(k-1)}}$$

$$\frac{Po}{P} = \left[1+\frac{k-1}{2}M^2\right]^{\frac{k}{k-1}}$$

In which:

$A$ = the cross-sectional area of the nozzle's conduit at any point along its longitudinal axis.

$A^*$ = the cross-sectional area of the nozzle conduit at the point where the Mach number of the gas in the nozzle = 1.0.

$M$ = the Mach number of the flowing gas at any point along the nozzle's longitudinal axis at which the nozzle's cross-sectional area is A and the pressure of the gas flowing is P.

$k$ = the ratio of specific heats of the gas flowing through the nozzle.

$Po$ = the absolute pressure of the gas at the nozzle inlet (stagnation pressure).

$P$ = the absolute pressure of the gas in the nozzle at any point along its longitudinal axis.

In order to produce a high-speed, low-pressure gas jet issuing from the nozzle, the ratio of the cross-sectional area of the nozzle exit to the corresponding area of the stabilizing section is made greater than 1 to 1 and preferably 1.5 to 1 or greater. When these conditions are established, it is believed that a very intense, concentrated "core" of sonic wave vibrational energy is created along the longitudinal axis of the nozzle in the region between the exit opening of the nozzle and the entrance of the pulsator cavity 18. The sonic pressure waves generated by the device then spread outwardly from this "core" of sonic energy.

A fluid feed tube 30 surrounds tubular section 12 of nozzle housing 10 and thus forms an annular fluid feed passage 34 surrounding tube 12, i.e. between tube 30 and tubular section 12. This fluid feed tube 30 has a bent and inclined end portion 32 which is attached to nozzle housing 10.

As is seen most clearly in FIGURE 3, fluid feed holes 36 are drilled at an angle from feed passage 34 through tube 12 and through the wall of nozzle member 20. Thus, fluids to be atomized are supplied along the paths indicated by the dashed arrows 35, through annular passage 34, through fluid feed holes 36, and into the region between the nozzle exit and the pulsator 18 where the fluid is broken up into small particles by the core of sonic energy in that region. The approximate paths believed to be taken by the fluids after they emerge from feed holes 36 are shown in FIGURE 3 and designated by numerals 37 and 39. The fluids are believed to be drawn into the shock wave area of the jet and then expelled, as shown. However, it should be emphasized that the precise path taken by such fluids is not known. The atomized particles then drift outward from the atomizer past its pointed end portion 16 of nozzle housing 10. The tapered, conical shape of end portion 16 assists in forming the atomized particles into a desirable pattern and eases their movement away from the atomizer.

The fluid feed holes 36 are located symmetrically with respect to one another and with respect to the legs 14 of nozzle housing 10 in order to envelop the gas emerging from nozzle 20 with a "curtain" of liquid to further maximize the atomizing efficiency of the atomizer. Although four feed holes are shown, the number used may be varied as desired. The greater the number of feed holes used, the more complete will be the "curtain."

Another advantage produced by this symmetrical construction is that it simplifies construction and mounting of the atomizer unit. Furthermore, with the fluid feed holes 36 so located, they are exposed to the sonic vibrations produced by the unit. Because of this the holes are cleaned automatically while the unit is operating, thus virtually eliminating the problem of clogging.

The above-described atomizing unit has several other advantages over devices previously available. As is mentioned above and explained in my above-identified copending patent applications, the pressure $P_E$ at the exit of nozzle 20 is usually considerably below the pressure of the gas surrounding the unit, and often is lower than one or two pounds per square inch absolute. For this reason a large pressure differential exists between the ambient gas and the gas jet issuing from the nozzle. This pressure differential creates an implosion or suction-induced inrush of gas from the ambient into the jet and the core of sonic energy between the exit opening of the nozzle and the pulsator cavity. In accordance with the present invention, the fluid to be atomized is supplied through the fluid feed holes 36 so as to be drawn by the inrushing implosion gas into the core of sonic energy at a rapid rate. This action initiates thorough agitation of the fluid by the intensely concentrated sonic wave energy in the core and makes the atomizer capable of effectively atomizing relatively large quantities of liquids. The resulting intimate interaction between the sonic wave energy and the fluid provides advantages in that substantially all of the fluid supplied is atomized without need for any auxiliary mixing chamber or other enclosure in which to subject the fluid to the sonic pressure waves.

The end 32 of fluid feed housing 30 is inclined with respect to the longitudinal axis of housing 10 in order to ease the flow of the gas being imploded from the ambient into the jet. This inclined form for end 32 also minimizes the surface area it presents to the atomized particles and thus reduces the likelihood of the particles condensing on it.

In order to obtain the maximum effect of this implosion upon the fluid being atomized, and, hence, the optimum atomizing output from the unit, the fluid is injected toward the nozzle's longitudinal axis into the region which extends from the exit opening of the nozzle to a point 28 in front of pulsator cavity 18. This region is identified in FIGURE 2 by the letter R. The point 28 is located at a distance S from the entrance of pulsator cavity 18. The approximate value for S that gives optimum results is $S = \lambda/4$, where the value for $\lambda$ is determined by use of Equation 1 which is set forth above.

When the fluid to be atomized is fed into region R, the potential rate and quality of atomization of fluid will be most nearly optimum. However, it should be understood that if fluid is injected beyond point 28 or is injected rearwardly into section 26 of nozzle 20, a useful atomized output will be obtained, even though it may not be as desirable as it would be if injection were made into region R. Also, it should be understood that the fluid to be atomized need not be introduced into the atomizing region at an angle to the longitudinal axis of the nozzle if it is introduced in a manner such that the imploding ambient gas is able to draw the fluid into the core of the sonic energy field. For example, a liquid introduced through feed tubes aligned parallel to the nozzle's longitudinal axis would be atomized effectively if it were fed at a low velocity into the region where the imploding gases flow toward the sonic energy core.

To realize most fully the rate and quality of atomization possible when fluid to be atomized is fed into region R as described above, the rate at which fluid is introduced into the atomizer should be set at or as near as possible to the flow rate at which there appears to be a sudden decrease in the sonic energy escaping into the ambient from the atomizer. This optimum flow rate can be detected by increasing the flow rate gradually upwardly from a relatively low value while simultaneously detecting the level of the sonic pressure wave energy escaping from the atomizer into the ambient. This detection may be performed by any one of a number of commercially available sound detection and measurement devices, or, if the sonic energy has a frequency within the audible range, the detection may be performed by ear. As the flow rate is gradually increased, a flow value will be reached where the detected level of escaping sonic energy will fall off suddenly and drastically. This flow rate is approximately the optimum flow rate, the rate at which the rate and quality of atomization will be most nearly optimum.

When fluid to be atomized is injected as described above, it usually enters the field of sonic vibrations at an acute angle to the longitudinal axis of the nozzle. When the several fluid feed holes 36, used to form a fluid "curtain," are located so as to feed the fluid into region R as described above, the intermingling and inward-drawing effect of the imploded gases is utilized most effectively. The fluid, it is believed, gathers in the region S between point 28 and the inlet of pulsator cavity 18 where it is subjected to the very intense "core" of sonic vibrations existing there and is atomized most effectively.

Another advantage of this atomizer is that its generator provides more sonic pressure wave power output for a given gas flow and input pressure than used by previous gas-operated atomizers. As a result, the atomizer requires less input power and is therefore more efficient.

A still further advantage of this atomizing unit is that it atomizes liquids into droplets which are of relatively uniform size; that is, the majority of the droplets produced have a diameter which falls within a relatively narrow range of values.

Figure 4:
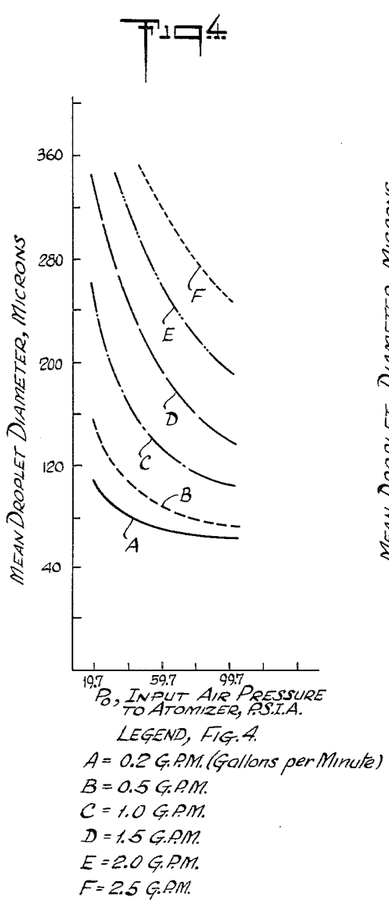
FIGURE 4 shows curves of the variations in the theoretical mean size of the droplets produced by atomizers of the present invention with changes in various operational characteristics of these atomizing units.
Figure 5:
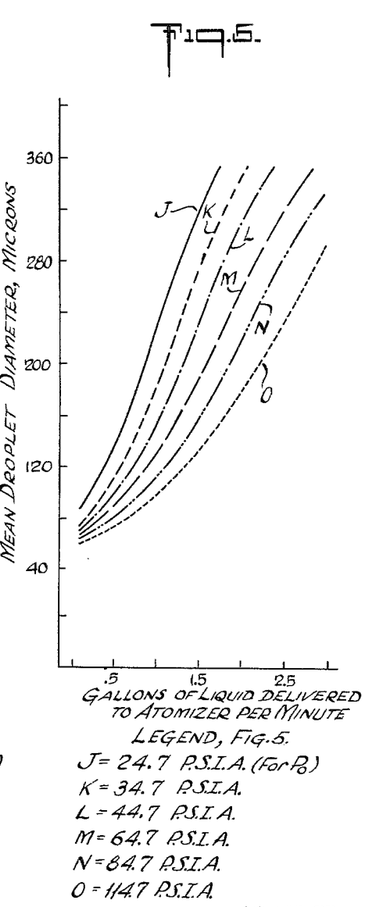
FIGURE 5 is another set of such curves for other such operational characteristics.

The curves shown in FIGURES 4 and 5 illustrate this feature. These curves display the relationship between different operational parameters of a typical atomizer constructed and operated in accordane with this invention. In FIGURE 4 the mean diameter of droplets of water atomized by such an atomizer is plotted against the pressure of the air input to the atomizer. The water flow rate to the atomizer is constant at a set value for each separate curve. In FIGURE 5 the mean droplet diameter is plotted against the water flow rate, with the input air pressure being constant for each separate curve. From these curves it is seen that the droplet size varies within a relatively narrow range despite substantial variations in gas input pressure or in liquid flow rate. Thus, the atomizer is very flexible in its range of operation and the quality of the spray it produces remains highly satisfactory despite considerable change in the requirements of the use to which it is put.

It is believed that the mean diameter of liquid droplets produced by atomizers in accordance with this invention is related approximately to the gas and liquid flow characteristics through the atomizer unit by the following empirical equation:

(2) $\qquad Y = 88.1 + 1064X - 1582X^2$ in which:

$$X = \frac{v^{0.2}(G+0.8)^{2.6} f A_E D_A^2}{P_0 V^2}$$

and $Y$ = Mean droplet diameter, in microns (millionths of a meter);
$P_0$ = Inlet gas pressure, in pounds per square inch absolute;
$G$ = Flow of liquid into the atomizer unit, in gallons per minute;
$V$ = Velocity of the liquid flow through the atomizer, in feet per second;
$v$ = Viscosity of the liquid being atomized, in pound-seconds—square feet;
$f$ = Frequency of the sonic output waves, in cycles per second;
$A_E$ = Area of the exit opening of the atomizer nozzle, in square inches;
$D_A$ = Diameter of the nozzle at the position where the gas pressure equals ambient pressure, in inches.

As is evident from the above equation, viscosity of the liquid being atomized has a relatively minor effect on droplet size. Therefore, atomizing units constructed in accordance with the present invention produce droplets whose size is, in most practical applications, relatively independent of the viscosity of a liquid being atomized. This means that the type of liquid being atomized may be changed radically without changing or adjusting the atomizing unit, or that temperature changes in the liquid during atomizing will not appreciably affect the desirable characteristics of the atomized output. This is in sharp contrast to the usual atomizer devices heretofore available in which, it is believed, atomization is accomplished primarily by subjecting the fluid to shearing forces, rather than by subjecting the fluid to sonic oscillatory vibrations as in the present invention. When atomization is produced by shearing action, it is believed that variations in the viscosity of the fluid being atomized have a critical and detrimental effect upon the performance of the atomizer, causing the production of particles of widely varying sizes and shapes.

A further advantage provided by the atomizer of the present invention is that it produces a cloud or spray of atomized particles that moves away from the atomizer with a relatively low forward velocity. In many prior gas-operated atomizers and sprayers, the forward velocity of the liquid is relatively high so that the particles pass though the zone in which they are most effectively utilized too rapidly to permit their most effective utilization. Since the forward velocity of particles produced by the present atomizer is so low, and because of the swirling cross-currents existing in the particle cloud, the particles may be made to drift through the zone of utilization so that they have ample opportunity to be used most effectively. Similarly, various forces, e.g. drafts of air and the like, can be used more effectively to guide the flight of slow-moving particles after they leave the atomizer.

Figure 6:
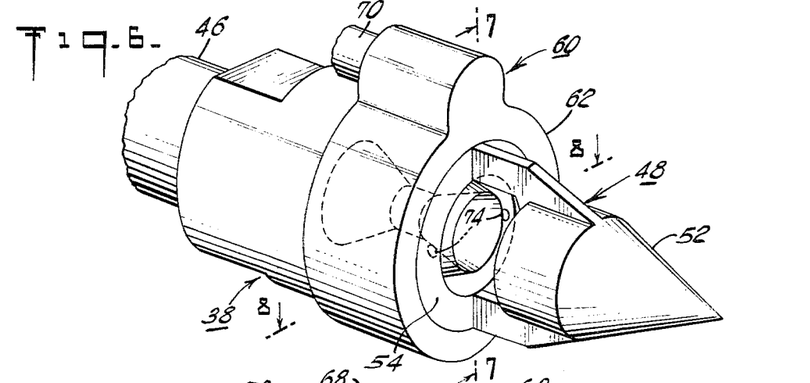
FIGURE 6 is a perspective view of another sonic pressure wave-operated atomizing unit embodying the present invention.
Figure 7:
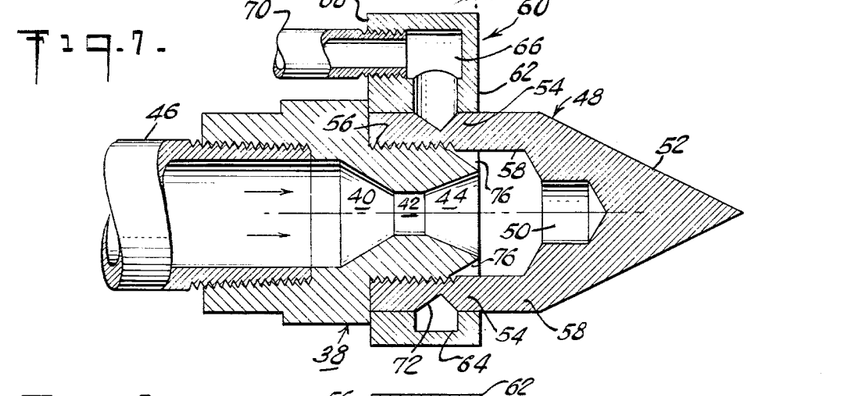
FIGURE 7 is a vertical sectional view taken along line 7—7 of FIGURE 6 in the direction of the arrows.
Figure 8:
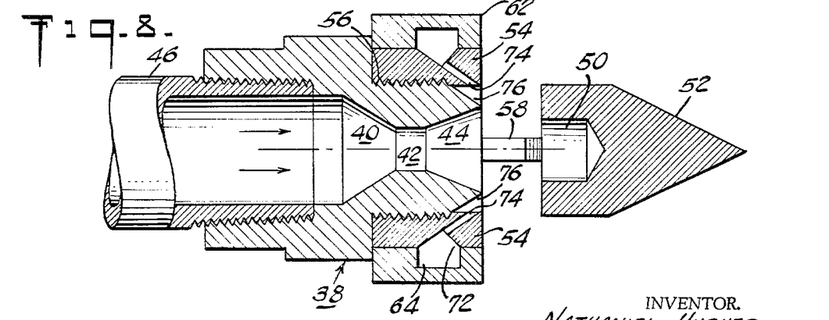
FIGURE 8 is a horizontal sectional view taken along line 8—8 of FIGURE 6 is the direction of the arrows.
Figure 9:
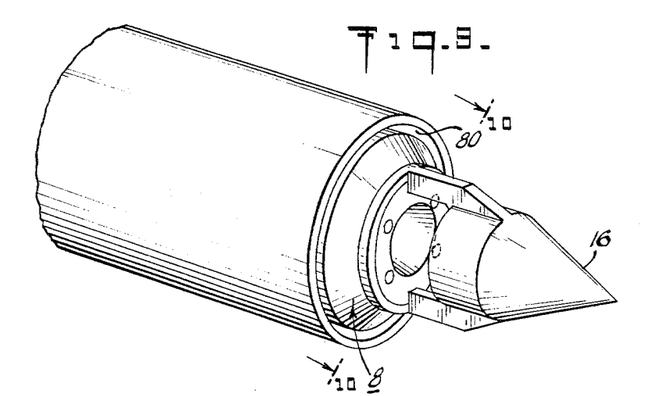
FIGURE 9 is a perspective view of another sonic pressure wave-operated atomizing unit embodying the present invention provided with means for directing the cloud of atomized fluid.
Figure 10:
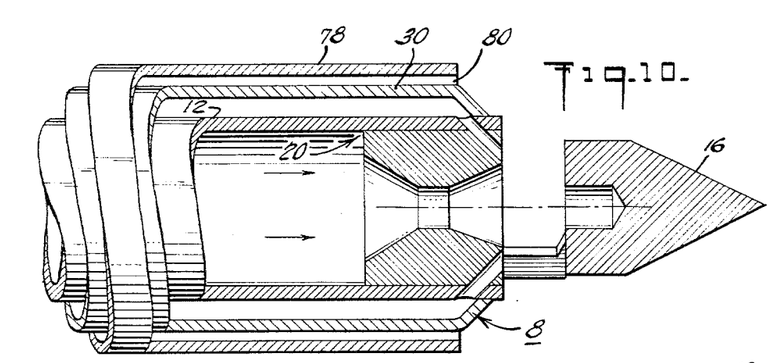
FIGURE 10 is a sectional view of the unit shown in FIGURE 9, taken in the plane of the fuel supply orifices along line 10—10 in the direction of the arrows.
Figure 11:
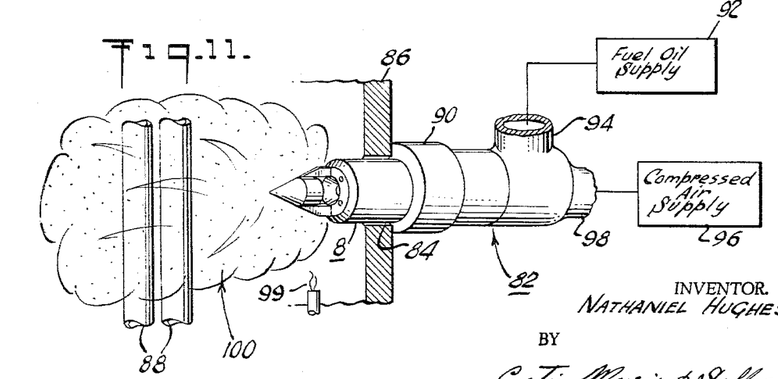
FIGURE 11 is a view, partially schematic and partially perspective, of a sonic pressure wave-operated fuel burner and furnace of the present invention.

Another atomizer of the present invention is shown in FIGURES 6 through 8 of the drawings. The atomizer unit illustrated in those figures comprises a nozzle portion, generally indicated at 38, which is similar to nozzle member 20 of FIGURES 1 through 3, having a converging inlet section 40, a cylindrical middle or "stabilizing" section 42, and a diverging outlet section 44. A source of pressurized gas (not shown) is connected through a pipe 46 to one end of nozzle portion 38, and a pulsator unit 48 is attached to the other end of nozzle 38. Pulsator unit 48 includes a pulsator chamber 50 which intercepts the gas jet produced by the nozzle 38 so that the unit generates sonic pressure wave energy, all in the manner described above.

Pulsator structure 48 includes a pointed end section 52 quite similar to end portion 16 of atomizer 8 shown in FIGURES 1–3. It comprises a generally ring-shaped portion 54 for adjustably attaching it to the nozzle 38 by means of screw threads 56, and a pair of slender leg-like members 58 which join the pointed section 52 to ring-like portion 54. Adjustments in the positioning of the pulsator unit 48 with respect to the exit end of nozzle 38 can be made by means of screw threads 56, as explained in my above-mentioned co-pending patent applications, to give optimum performance in the generation of sonic energy in this unit.

A fluid feed structure, generally indicated at 60, encircles and is affixed to the exterior surface of ring-like portion 54 of pulsator unit 48. Feed structure 60 includes an annular ring portion 62 having an internal rectangular-shaped groove 64 and a connector projection 66 which communicates with groove 64. Projection 66 is internally threaded at 68 to receive the end of a similarly threaded pipe 70 through which the fluid to be atomized is supplied. Groove 64 in ring 62 is opposite to a generally V-shaped groove 72 cut into the exterior surface of ring-like portion 54 of pulsator unit 48, thus forming with grove 64 an annular fuel supply channel. As is most clearly seen in FIGURE 8, two fluid feed holes 74 pass from this channel through the wall of section 54 at an acute ange to the longitudinal axis of the nozzle 38. These fluid delivery holes 74 are located symmetrically with respect to one another and to legs 58 of pulsator unit 48, and they exit into a generally V-shaped annular groove portion 76 around nozzle 38.

Fluids to be atomized are supplied through pipe 70 into connector 66, and then pass into the annular channel formed by grooves 64 and 72, through holes 74, and into the region between the exit of nozzle 38 and the entrance of pulsator cavity 50 where the fluid is subjected to intense sonic pressure wave vibrations in the manner described above. The angle of the sides of groove 76 helps to define the angle at which the greatest portion of the atomized fluid is sprayed outwardly from the atomizing unit. This spray cone angle is further adjustable to a limited extent by means of screw threads 56.

The embodiment shown in FIGURES 6–8 has the advantage that the pipe 70 and connector 66 can be located above the remainder of the unit so that the flow of fluent material to be atomized will be aided by gravity. Also the external connections to the unit can be made simply and quickly. Further, as mentioned above, the distance between pulsator cavity 50 and the exit of nozzle 38 easily may be adjusted to optimize the sonic power output and the spray characteristics of the unit.

As mentioned above, atomizer units constructed and operated in accordance with this invention produce a cloud of atomized particles which drift forwardly from the atomizer relatively slowly. Although this type of cloud or spray often is preferred, sometimes it is desirable to increase the speed and distance of outward projection of the atomized particles from the atomizer. In addition, it is often desirable to shape the resulting atomized mist into a definite pattern having a more precisely controlled spray cone angle.

In accordance with the present invention this spray projection pattern can be controlled by increasing the pressure of the input gas to a value which imparts sufficient forward velocity to the atomized particles to provide the spray cone angle desired, and also to control the projection distance or "throw" of the atomized particles. This control can be effected with relatively little change in the operation of the atomizer in providing optimum particle size and atomizing efficiency.

In instances when such spray projection pattern control is desired without increasing the normal operating pressure of the input gas then, in accordance with the present invention, it is possible to control the low-velocity cloud of atomized particles by means of a curtain of gas. FIGURES 9 and 10 show an atomizer arrangement that provides spray control in this manner. This device comprises an atomizer 8, such as is shown in FIGURES 1 through 3, with a spray projection and cone angle control tube 78 surrounding its exterior. Tube 78 is cylindrically shaped so as to provide an annular space 80 between the inside surface of tube 78 and the exterior surface of tube 30 of the atomizer. A supply of pressurized gas (not shown) is connected to tube 78 and forces the gas through the annular opening 80 to form a stream of gas in the form of curtain around and beyond the end of the atomizer 8. By varying the pressure of this gas supply, the spray projection and cone angle of the atomizer may be controlled.

Atomizers constructed and operated in accordance with this invention provide special advantages when they are used in fluid fuel burners for furnaces and the like. FIGURE 11 shows a fuel burner using a sonic atomizer 8, of the type shown in FIGURES 1 through 3, mounted in a fluid feed unit, generally indicated at 82. This fuel atomizer 8 projects through a hole 84 in a wall 86 of a furnace which may be used to heat boiler tubes 88 or the like.

Atomizing unit 8 is fitted to a coupling device 90 which permits its easy insertion and removal, thus providing easy interchangeability of atomizing units in the furnace. Liquid fuel, such as furnace oil, is provided from a supply 92 and is fed into fluid feed unit 82 through a pipe 94. Similarly, pressurized air to operate atomizing unit 8 is fed from a supply 96 through pipe 98 to feed unit 82. The spray cloud of fuel emitted from atomizing unit 8 may be ignited initially by a gas flame 99, a spark, or other suitable igniting device, and thereafter it immediately bursts into a flame 100 and continues to burn without the need for further ignition.

The flame 100 produced by this fuel burner is an essentially "white" flame– that is, a flame in which combustion is essentially complete and is substantially uniform throughout. It is believed that this complete and uniform combustion is brought about by the substantially uniform droplet size and even distribution of these droplets throughout the spray produced by the atomizing unit 8. This complete combustion not only increases the efficiency of the burner and the furnace in which it is operated, but it reduces the amount of maintenance work required to keep the boiler tubes 88 and furnace walls 86 clean. This is so because the fuel is burned so much more completely with fuel atomizers of the present invention than with those previously available that there is relatively little build-up of unburned fuel and carbon deposits on the surfaces of the furnace walls, the boiler tube and related structures. Furthermore, this efficiency and cleanliness of burning exist throughout a wide range of variations in fuel flow rate and/or input gas pressure because of the relatively narrow band over which the mean droplet size of the atomized fuel particles varies, as illustrated by the curves in FIGURES 4 and 5. This band is well within the range of particle sizes desirable for efficient and clean combustion of most fluid fuels.

Not only is the flame 100 a "white" flame, but it is also a "soft" flame; that is, it drifts forward from atomizer 8 with a low forward velocity. This type of flame transfers heat to objects such as the boiler tubes 88 more completely and efficiently than "hard" flames produced by many prior burners. Such "hard" flames rush past the boiler tubes so fast that they carry much of their heat up the smokestack without its ever being used. In contrast, the "soft" flame of the present burner swirls slowly around the boiler tubes, thus providing adequate time to permit the heat of the flame to be transferred to the boiler.

Another important advantage of this fuel burner is that it is capable of handling large quantities of fuel. For example, fuel burners of moderate size and constructed in accordance with the present invention have been used to burn highly viscous "Bunker C" fuel oil at rates of several hundreds of gallons per hour.

The relative independence of the droplet size from the viscosity of the fuel being atomized adds further fuel-handling capacity to the burner because fuel may be supplied at a relatively low temperature. For example, tests have been made in which the temperature of fuel burned during the test was decreased to such an extent that its viscosity was increased by between 4 and 6 times the viscosity it usually has when being fed into a burner. Despite this substantial increase in viscosity, the fuel was burned throughout the test at a high rate and with a consistently "white" flame showing virtually complete combustion.

As mentioned above, fluid fuel burners available prior to the present invention frequently suffer from flame instability. One type of such instability is the "flame-out" or unpredictable flame extinguishment due to gusts of furnace air or other causes. Since it is difficult to stop the flow of fuel to the burner quickly enough when such a flame-out occurs, the inside of the furnace in which the burner operates is usually coated with the considerable unburned fuel which is sprayed into the furnace after flame-out and before the fuel flow is stopped. Furnace fuel burner arrangements constructed an operated in accordance with the present invention are highly resistant to such flame-outs and thus the furnaces in which they are used generally are not subjected to this trouble. It is believed that this resistance to flame-out is caused by the "implosion" effect created in the atomizer 8 as described above. This flow of imploded air seems to draw inwardly some of the atomized fuel particles, both unburned and burning, and feed them back into the core of sonic energy in front of the atomizer nozzle. Thus, this feedback of burning particles with the imploding air provides at all times a source of re-ignition for the flame if a portion of it is snuffed out by transient air gusts or other dislocating forces. Further, the flow of imploded air into the sonic energy core is so strong that it is not altered appreciably by the relatively weak gusts of air and other gases usually encountered in a furnace.

Other types of flame instability experienced by prior burners are rumbling and flame drift, due to uneven and non-uniform atomization of the fuel. The even and uniform fuel atomization of the burner of the present invention largely eliminates these types of instability and produces a soft flame which is steady, white, and flame-out-resistant.

The above description is intended to describe only a few of the possible embodiments of the present invention. Any deviations in the specific structures shown herein can be made by those skilled in the art without substantially departing from the spirit and scope of this invention.

I claim:

1. Apparatus for atomizing fluent materials, said apparatus comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, said last-named means giving said passageway the shape of a frustrum of a cone, resonator means positioned downstream from said exit opening of said nozzle and intercepting the high-speed gas stream issuing from said exit opening, and means for feeding said fluent materials into the gas forming said stream and upstream from said resonator means, and subjecting said fluent materials to pressure waves developed by said generator and effecting the atomization of said fluent materials.

2. Apparatus for atomizing fluent materials, said apparatus comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, the rate of increase in area provided by said last-named means being less than the rate which would cause substantial separation of the gas flow from the walls of said gas passageway, the ratio of the maximum cross-sectional area of said passageway to the minimum cross-sectional area of said passageway being sufficient to produce acceleration of a compressed gas to supersonic velocities, resonator means positioned downstream from said exit opening of said nozzle and intercepting the high-speed gas stream issuing from said exit opening, and means for feeding said fluent materials into the gas forming said stream in the vicinity of said nozzle, and subjecting said fluent materials to pressure waves developed by said generator and effecting the atomization of said fluent materials.

3. Apparatus for atomizing fluent materials, said apparatus comprising, in combination, a gas-operated pressure wave generator including a gas-expanding and accelerating nozzle comprising a body member forming a gas flow passageway having an exit opening for issuing a high-speed gas steam, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, the ratio of the maximum cross-sectional area of said passageway to the minimum cross-sectional area of said passageway being sufficient to produce acceleration of a compressed gas to supersonic velocities and being at least 1.5, resonator means positioned downstream from said exit opening of said nozzle and intercepting the high-speed gas stream issuing from said exit opening, and means for feeding said fluent materials into the gas forming said stream in the vicinity of said nozzle, and for subjecting said fluent materials to pressure waves developed by said generator and effecting the atomization of said fluent materials.

4. Apparatus for atomizing fluent materials, said apparatus comprising, in combination, a gas-operated pressure wave generator including a gas-accelerating and stream-forming nozzle comprising a body member forming a gas flow passageway, first and second longitudinal positions in said body member, restrictor means reducing the cross-sectional area of said gas flow passageway and forming a reduced orifice at said first longitudinal position, expansion means in said gas flow passageway between said orifice and said second longitudinal position, said expansion means providing an increasing cross-sectional area for said passageway between said orifice and said second longitudinal position in the direction of flow of gas through said nozzle, resonator means, means for positioning said resonator means adjacent the exit opening of said gas passageway, the ratio of the cross-sectional area of said gas passageway at said second longitudinal position to the cross-sectional area of said gas passageway at said first longitudinal position being at least 1.5, and means for feeding said fluent materials into the gas forming said stream in the vicinity of said nozzle and upstream from said resonator means, and subjecting said fluent materials to pressure waves developed by said generator and effecting the atomization of said fluent materials.

5. Apparatus for atomizing fluent materials, said apparatus comprising, in combination, a gas-operated pressure wave generator including a nozzle body having a gas-passageway therethrough with a frustro-conical converging inlet section, a frustro-conical diverging outlet section, and a throat connecting said converging and diverging sections, the ratio of the cross-sectional area of said gas passageway at the exit of said nozzle being at least 1.5 times as great as the cross-sectional area of said gas passageway in said throat, a resonator member forming a cylindrical resonator cavity, support means secured to said nozzle body and said resonator member to position said resonator cavity with its open end facing said outlet section of said nozzle, and means for feeding said fluent materials into the gas forming said stream in the vicinity of said nozzle, and subjecting said fluent materials to pressure waves developed by said generator and effecting the atomization of said fluent materials.

6. A mehod of atomizing fluid materials in a gaseous ambient medium, said method comprising the steps of generating pressure waves in said medium by expanding and accelerating a gas to form a supersonic gas stream flowing in said ambient medium, the supersonic flow in said stream producing shock waves in a region of said stream, controlling said expansion and acceleration so that it creates a region of sub-ambient pressure in said stream and creates an inrush of ambient gas into said sub-ambient pressure region of said stream, resonantly amplifying said shock waves in said stream and feeding said fluent materials into the gas forming said supersonic stream.

7. A method as in claim 6 in which said fluent materials are injected into said sub-ambient pressure region of said stream.

8. A method as in claim 6 in which said fluent materials are fed into said sub-ambient pressure region of said supersonic stream, and said resonant action is performed by directing said supersonic stream into resonator means.

9. An atomizing method utlizing an atomizer having a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, resonator means positioned adjacent said nozzle exit opening, and means for feeding materials to be atomized into the gas forming said stream, said method comprising supplying a compressed gas to said atomizer and maintaining the absolute pressure $P_o$ of said compressed gas within a range in which P, the absolute pressure of said gas stream at said exit opening of said nozzle is always less than the absolute pressure of the gaseous ambient medium into which said gas stream is issued, the upper limit of said range corresponding to the value for $P_o$ given by the following equation when the value for P is adjacent but below the value of said pressure of said gaseous ambient medium:

$$\frac{Po}{P}=\left[1+\frac{k-1}{2}M^2\right]^{\frac{k}{k-1}}$$

in which:

M is the Mach number of said gas jet at said nozzle exit; and $k$ is the ratio of specific heats for said gas in said jet.

10. Apparatus for atomizing fluent materials, said apparatus comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, resonator means, means for positioning said resonator means adjacent said exit opening of said nozzle, means supplying compressed gas to said flow passageway at a pressure which is less than the approximate value of P$o$ given by the following equation when P equals the absolute pressure of said gaseous ambient medium and M is equal to 1:0.

$$\frac{Po}{P}=\left[1+\frac{k-1}{2}M^2\right]^{\frac{k}{k-1}}$$

in which:

P$o$ is the absolute pressure of said compressed gas, and $k$ is the ratio of specific heats for said compressed gas, and means for feeding said fluent materials into the gas forming said stream in the vicinity of said nozzle, subjecting said fluent materials to pressure waves developed by said generator, and effecting the atomization of said fluent materials.

11. An atomizer comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, said high-speed gas stream having oblique shock waves forming a periodic shock-wave outline pattern, the first of said waves downstream from said exit opening of said nozzle means being a compressional shock wave, and cavity resonator means positioned downstream from said exit opening and intercepting said jet with the reflecting surface of said cavity resonator being located within said first shock wave, and means for feeding said fluent materials into the gas forming said stream in the vicinity of said nozzle, and subjecting said fluent materials to pressure waves developed by said generator and effecting the atomization of said fluent materials.

12. Apparatus for atomizing fluent materials, said apparatus comprising, in combination, a gas-operated pressure wave generator including a gas-accelerating and stream-forming nozzle comprising a body member forming a gas flow passageway, first, second and third longitudinal positions in said body member, said second position being spaced from said first position in the direction of flow of gas through said nozzle and said third position being spaced from said second position in the direction of flow of gas through said nozzle, restrictor means reducing the cross-sectional area of said gas flow passageway and forming a reduced orifice at said first longitudinal position, stabilizing means in said gas flow passageway between said reduced orifice and said second longitudinal position, said stabilizing means providing a substantially constant cross-sectional area for said passageway between said reduced orifice and said second longitudinal position, said stabilizing means also providing another orifice at said second longitudinal position, said other orifice having a cross-sectional area substantially equal to that of said reduced orifice, expansion means in said gas flow passageway between said other orifice and said third longitudinal position, said expansion means providing an increasing cross-sectional area for said passageway between said other orifice and said third longitudinal position in the direction of flow of gas through said nozzle, resonator means, means for positioning said resonator means adjacent the exit opening of said gas flow passageway, and means for feeding said fluent materials into the gas forming said stream in the vicinity of said nozzle, and subjecting said fluent materials to pressure waves developed by said generator and effecting the atomization of said fluent materials.

13. Apparatus for atomizing fluent materials, said apparatus comprising, in combination, a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, resonator means positioned downstream from said exit opening of said nozzle and intercepting the high-speed gas stream issuing from said exit opening, and means for injecting said fluent materials towards said high-speed gas stream at a position located between said nozzle and said resonator means and in a direction forming an angle with the direction of flow of said stream.

14. Fuel combustion apparatus comprising, in combination, a combustion enclosure having walls subject to being detrimentally coated with unburned fuel residues, fuel burner means for atomizing a fluid fuel, spraying the atomized fuel into said enclosure, and burning said fuel with high efficiency and relatively little unburned residue, said fuel burner means comprising a gas-operated pressure wave generator including a gas-expanding and accelerating nozzle comprising a body member forming a gas flow passageway having an exit opening for issuing a high-speed gas stream, means in said body member for constricting said gas flow passageway upstream from said exit opening, means in said body member downstream from said constricting means and adjacent said exit opening of said gas flow passageway for giving said passageway a cross-sectional area increasing in the direction of flow of gas through said nozzle, resonator means positioned downstream from said exit opening of said nozzle and intercepting the high-speed gas stream issuing from said exit opening, means for feeding said fluid fuel into the gas forming said stream in the vicinity of said nozzle, and subjecting said fluid fuel to pressure waves developed by said generator and effecting the atomization of said fluent materials, and means for supplying a compressed gas to said gas flow passageway of said nozzle.

15. Boiler apparatus comprising, in combination, a furnace enclosure, boiler tubes mounted in said enclosure and adapted to carry fluids to be heated, said boiler tubes and the walls of said furnace enclosure being subject to being detrimentally coated with unburned fuel residues, fuel burner apparatus for atomizing fluid fuel, burning said atomized fuel and projecting the flaming fuel into said furnace and against said boiler tubes, said fuel burner comprising a gas-operated pressure wave generator including a gas-accelerating and stream-forming nozzle comprising a body member forming a gas flow passageway, first and second longitudinal positions in said body member, restrictor means reducing the cross-sectional area of said gas flow passageway and forming a reduced orifice at said first longitudinal position, expansion means in said gas flow passageway between said orifice and said second longitudinal position, said expansion means providing an increasing cross-sectional area for said passageway between said orifice and said second longitudinal position in the direction of flow of gas through said nozzle, resonator means, means for positioning said resonator means adjacent the exit opening of said gas passageway, the ratio of the cross-sectional area of said gas passageway at said second longitudinal position to the cross-sectional area of said gas passageway at said first longitudinal position being at least 1.5, and means for feeding said fluid fuel into the gas forming said stream in the vicinity of said nozzle, and subjecting said fluid fuel to pressure waves developed by said generator and effecting the atomization of said fluid fuel, means for supplying a compressed gas to said gas passageway, and means for supplying said fuel to said feeding means.

16. Apparatus as in claim 2 in which said feeding means includes means for injecting said fluent materials towards said high-speed gas stream at a position between said nozzle and said resonator means and in a direction forming an angle with the direction of flow of said stream.

17. Apparatus as in claim 10 including means for injecting said fluent materials towards said high-speed gas stream at a position between said nozzle and said resonator means and in a direction forming an angle with the direction of flow of said stream.

18. Apparatus as in claim 2 in which said feeding means comprises a hollow member surrounding said nozzle body member for receiving and conducting said fluent materials, said nozzle body member having at least one hole communicating with the hollow interior of said hollow member, said hole being located so as to guide said fluent materials into the gas stream created by said nozzle.

19. Apparatus as in claim 18 in which said hole is located so as to guide said fluent materials into said gas stream at a position between said exit opening of said nozzle and said resonator means.

20. Apparatus as in claim 11 in which said gas flow passageway has a substantially circular cross-sectional shape, and in which said reflecting surface is located between $\lambda$ and $3/2\lambda$ downstream from the plane of location of the diameter $D_A$, the diameter of said gas passageway at the position where the pressure of the gas in said passageway equals that of the gaseous ambient medium surrounding said nozzle, where $\lambda$ is given approximately by the following equation:

$$\lambda = 1.307 D_A \sqrt{M_E^2 - 1}$$

in which $M_E$ is the Mach number of the gas in said stream at said exit of said passageway.

21. Apparatus as in claim 20 in which said reflecting surface is located between the first intersection point and the end of said first wave in said shock wave outline pattern.

22. Apparatus as in claim 10 in which said resonator means comprises a resonator member with a resonator cavity in it, and means for positioning said resonator member with said cavity intercepting said gas stream and with the rear wall of said cavity being located downstream from said exit opening of said nozzle at a point between $\lambda$ and $3/2\lambda$ distant from the plane of location of the nozzle diameter $D_A$, where $\lambda$ is given approximately by the following equation:

$$\lambda = 1.307 D_A \sqrt{M_E^2 - 1}$$

in which:

$D_A$ equals the internal diameter of said nozzle means at the position where the pressure of the gas in said nozzle equals atmospheric pressure; and $M_E$ equals the Mach number of the gas in said jet at said nozzle exit opening.

23. Apparatus as in claim 14 in which said fluid fuel is a carbonaceous liquid, and said compressed gas is a combustion-supporting gas.

References Cited by the Examiner

UNITED STATES PATENTS

| | | | |
|---|---|---|---|
| 2,042,034 | 5/1936 | Wyman | 158—76 |
| 2,532,554 | 12/1950 | Joeck | 158—77 |
| 2,865,441 | 12/1958 | Coupe | 158—28 X |
| 3,070,313 | 12/1962 | Fortman | 239—4 X |
| 3,081,946 | 3/1963 | Soloff | 239—4 X |
| 3,084,868 | 4/1963 | Faler | 239—102 |

OTHER REFERENCES

Publication: Sound Waves Form Uniform Drops in Spray Nozzle, Chemical Engineering, Sept. 4, 1961, pp. 84, 86.

JAMES W. WESTHAVER, *Primary Examiner.*